United States Patent

[11] 3,576,488

| | | | |
|---|---|---|---|
| [72] | Inventors | Wilhelm J. Zug | |
| | | Raleigh, N.C.; | |
| | | Harold C. Riggs, Langhorne, Pa. | |
| [21] | Appl. No. | 739,735 | |
| [22] | Filed | June 25, 1968 | |
| [45] | Patented | Apr. 27, 1971 | |
| [73] | Assignee | ESB Incorporated | |

[54] BATTERY DISCHARGE INDICATOR AND CONTROL CIRCUIT
4 Claims, 2 Drawing Figs.

[52] U.S. Cl. .................................................. 320/48,
317/31, 320/30, 320/40, 340/249
[51] Int. Cl. ...................................................... H02j 7/00
[50] Field of Search............................................ 320/30, 40,
48; 340/249; 307/235; 328/146, 148; 317/31

[56] References Cited
UNITED STATES PATENTS

| | | | | |
|---|---|---|---|---|
| 3,343,036 | 10/1967 | Steen............................ | | 312/31 |
| 3,474,296 | 10/1969 | Rickey ......................... | | 320/40X |
| 3,475,061 | 10/1969 | Steinkamp et al. ............ | | 320/48 |
| 3,184,729 | 5/1965 | Freedman et al. ............ | | 328/146X |
| 3,310,724 | 3/1967 | Grafham ...................... | | 320/39 |
| 3,320,493 | 5/1967 | Culbertson................... | | 307/235X |
| 3,389,325 | 6/1968 | Gilbert ......................... | | 320/48(UX) |
| 3,447,060 | 5/1969 | Tedd ............................ | | 320/48 |

*Primary Examiner*—J. D. Miller
*Assistant Examiner*—John M. Gunther
*Attorneys*—Alfred J. Snyder, Jr. and Robert H. Robinson ABSTRACT: A battery discharge indicator which is particularly adapted for monitoring the terminal voltage of a battery supplying power for a battery-operated industrial truck. The indicator is operative to provide a warning signal when the voltage of the battery falls below a given value and includes timing and switching means which, if the battery is not recharged within a predetermined period of time is operative to prevent the truck from doing any work other than travelling thereby reserving the power remaining in the battery for the return of the truck to the charging station.

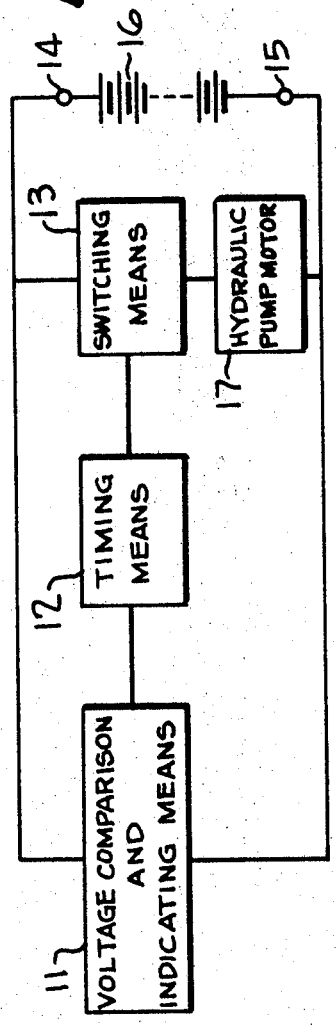
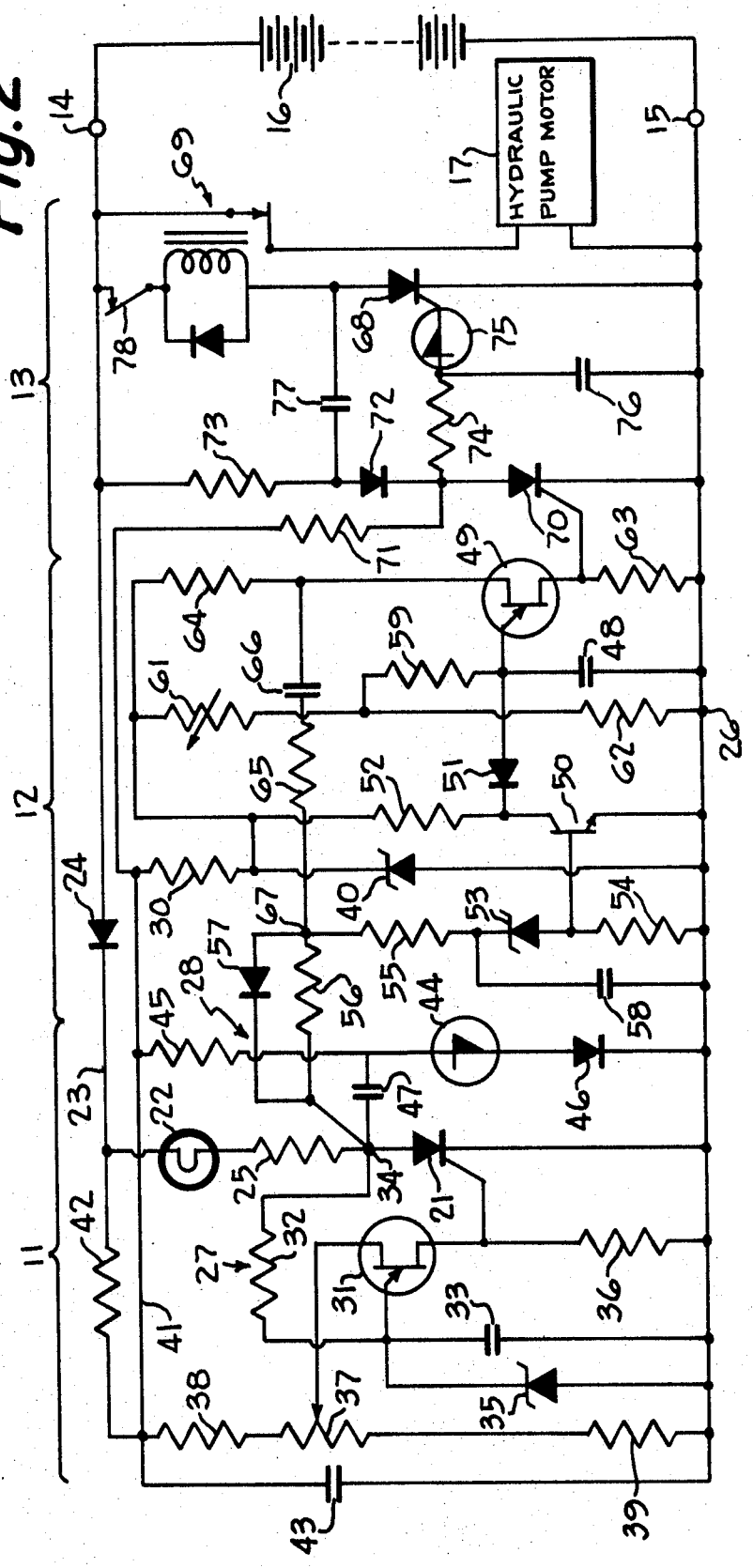

3,576,488

BATTERY DISCHARGE INDICATOR AND CONTROL CIRCUIT

BACKGROUND OF THE INVENTION

The voltage of a battery generally decreases during discharge and at some predetermined voltage the battery can be considered to be discharged completely. In many applications, for example in an industrial truck, it is desirable to have an indication that the battery supplying power to the truck is approaching a state of complete discharge so that the vehicle can be returned to the charging station for recharging while there is still power available in the battery to get it there. Without such a warning device, the first indication could be complete battery discharge. This could occur a considerable distance from the charging station which might necessitate towing the vehicle to the charger or the transportation of a charger to the vehicle. Prior art battery discharge indicators, however, provide only a warning which if disregarded, may still result in an overdischarge battery which will be unable to return the truck to the charging station.

In battery powered industrial trucks, the lifting clamping or other material handling operations are controlled independently of the truck-driving circuit. These operations are actuated by a hydraulic pump driven by an electric motor powered by the truck battery. Accordingly, battery power used for material handling operations is power which is unavailable for driving the truck.

It is an object of this invention to provide means for preventing an industrial truck battery from being overdischarged before the truck is returned to its charging station.

It is another object of the present invention to provide means which will insure that when the voltage of an industrial truck battery falls below a given value, the power remaining in the battery will be conserved and used for returning the truck to its charging station.

It is still another object of the present invention to provide means which will not only give an indication of when the battery voltage falls below a given level signalling the need for recharging but, which, if this indication is ignored for a predetermined period of time, will prevent the truck from performing any material-handling operation until the battery is recharged.

SUMMARY OF THE INVENTION

In accordance with the present invention there is provided a battery discharge indicator-controller for an industrial truck which is adapted to provide an indication when the terminal voltage of the battery under supervision falls below a predetermined level indicating the need for recharging. The device is further adapted to disconnect the hydraulic pump control circuit of the truck from the battery if the indication of low battery voltage is ignored for a predetermined period of time. In this manner, the power remaining in the battery is conserved for driving the truck to the recharging station.

The indicator-controller of the present invention has three functional sections, a voltage sensing and indicating circuit, a timing circuit, and a switching circuit which disconnects the hydraulic pump control circuit from the battery. The voltage-sensing and indicating circuit comprises an indicating means connected in series with a solid-state switching element across the terminals of the battery. Circuit means responsive to the difference between the battery voltage and a regulated voltage are connected to the switching element to activate the switching element to energize the indicating means when the voltage of the battery decrease to a predetermined level relative to the regulated voltage. The timing circuit is actuated when the indicating means is energized to initiate a timing cycle. If the indicating means is not deenergized during the timing cycle, the timing circuit actuates the switching means to disconnect the hydraulic pump control circuit from the battery. Since the truck cannot perform any material-handling operation with the hydraulic pump control disconnected from the battery, the power remaining in the battery is conserved for returning the truck to its charging station. While the discharge indicator and control circuit of the present invention is particularly adopted for use on an industrial truck, it should be understood that it is equally adapted to monitor any battery operation where it is desirable or necessary to conserve the battery power for critical loads.

BRIEF DESCRIPTION OF THE DRAWINGS

FIG. 1 is a block diagram illustrating the functional sections of a battery discharge indicator and control circuit of the present invention; and FIG. 2 is a circuit diagram of a preferred embodiment of the present invention.

DESCRIPTION OF THE PREFERRED EMBODIMENTS

The block diagram of FIG. 1 shows the three functional sections of a battery discharge indicator and control circuit of the present invention. These are the voltage-sensing and indicating means 11, a timing means 12 and a switching means 13. As shown, the indicator-controller has a pair of terminals 14 and 15 which are adapted to be connected across the terminals of a battery 16 supplying power to an industrial truck. In operation, the voltage sensing and indicating means 11 provides a warning signal when the voltage of the battery 16 has decreased to a predetermined value and at the same time energizes the timing means 12. If the warning signal provided by the voltage-sensing and indicating means 11 is ignored for a preset time period, the timing means 12 is operative to energize the switching means 13 to disconnect the hydraulic pump motor 17 of the truck from the battery 16 thereby preventing the truck from performing any functions other than locomotion until the battery 16 has been disconnected for recharge.

Referring now to FIG. 2, there is shown a circuit diagram of a preferred embodiment of the present invention. The voltage comparison and indicating section 11 of the circuit is of the type described and claimed in U.S. Pat. No. 3,349,386 issued Oct. 24, 1967 to Wilhelm J. Zug. This section circuit employs an SCR 21 to control the periodic energization of a lamp 22 to indicate that the voltage of the battery 16 has decreased to a predetermined level. The lamp 22 is connected to the terminal 14 by means of a conductor 23 and a diode 24. The lamp 22 is connected to the terminal 15 through a resistor 25, the SCR 21 and a conductor 26. The SCR 21 is triggered between conduction and nonconduction by a turn-on circuit generally designated 27 and a turnoff circuit generally designated 28.

The turn-on circuit 27 employs a unijunction transistor 31 having the usual emitter and a pair of bases to supply firing pulses for the SCR 21. As shown, the emitter of the unijunction transistor 31 is connected to the junction of a resistor 32 and a capacitor 33 which are in turn connected in series between the conductor 26 and circuit point 34 which is between the resistor 25 and the SCR 21. A Zener diode 35 is connected across the capacitor 33 to clamp the voltage across that capacitor at a fixed value. One base of the unijunction transistor 31 is connected to the conductor 26 by means of a resistor 36 and the other base is connected to a tap on an adjustable resistor 37. The adjustable resistor 37 is part of a voltage divider formed by resistors 37, 38 and 39 which are connected in series between the conductor 26 and a conductor 41. The conductor 41 is connected to the terminal 14 by a resistor 42, the conductor 23 and the diode 24. The resistor 42 and a capacitor 43 which is connected in shunt across the resistors 37, 38 and 39 form a filter circuit which protects the indicator-controller from transient currents.

The turnoff circuit 28 for the SCR 21 utilizes a Schockley diode 44 as its switching element. The anode of the Schockley diode 44 is connected to the conductor 41 through a resistor 45. The cathode of the Schockley diode 44 is connected through a diode 46 to the conductor 26. The diode 46 protects the Schockley diode from reverse voltage breakdown. The anode of the Schockley diode 44 is also connected to the circuit point 34 by a capacitor 47.

The timing circuit 12 employs the charge on a capacitor 48 connected to the emitter of a unijunction transistor 49 to provide an adjustable time delay. The charging of the capacitor 48 is in turn controlled by a transistor 50 connected in shunt across the capacitor 48 by means of a diode 51. The emitter of the transistor 50 is connected to the conductor 26 and the collector is connected to the conductor 41 by the resistors 52 and 30. The base of the transistor 50 is connected to the junction of a Zener diode 53 and a resistor 54 which are connected between the conductor 26 and the circuit point 34 by a pair of resistors 55 and 56. The resistor 56 is shunted by a diode 57. The Zener diode 53 and resistor 54 are shunted by a capacitor 58.

The timing capacitor 48 is connected by means of a resistor 59 to the junction of an adjustable resistor 61 and a resistor 62 which are connected as a voltage divider across the Zener diode 40, fed from conductor 41 by resistor 30. The capacitor 48 is connected to the emitter of the unijunction transistor 49 to control the firing of this transistor. One base of the transistor 49 is connected to the junction of the resistor 63 and the gate of the SCR 70 and the other base is connected through a resistor 64 and the resistor 30 to the conductor 41. This base of the unijunction transistor 49 is also connected through a resistor 65 and a capacitor 66 to a circuit point 67 in the base circuit of the transistor 50.

The timing circuit 12 controls the operation of the static switching circuit 13 which employs an SCR 68 to disconnect the hydraulic pump motor 17 from the battery 16 by deenergizing the contact coil 69. The firing of the SCR 68 is in turn controlled by an SCR 70 which is connected to the base of the unijunction transistor 49 and the output of the timing circuit 12. The anode of the SCR 70 is connected to the conductor 41 by means of a resistor 71 and to the terminal 14 through a diode 72 and a resistor 73. The anode of the SCR 70 is also connected to the SCR 68 through a network comprising a resistor 74, a Schockley diode 75 and a capacitor 76. The anode of the SCR 68 is tied to the anode of the SCR 70 by a capacitor 77 and a diode 72.

The operation of the circuit is such that when the terminals 14 and 15 are connected across a battery having a high state of charge, the capacitor 33 is charged through the lamp 22 to a voltage determined by the Zener diode 35. The voltage across the capacitor 33 and hence the voltage across the emitter base of the unijunction transistor 31 are held constant by the Zener diode 35. As long as this voltage is less than the peak point voltage of the unijunction transistor 31, the transistor 31 remains in a high resistance state. As the voltage across the terminals 14 and 15 decrease during battery discharge, the interbase voltage of the transistor 31 decreases proportionally. When this voltage reaches a level such that the voltage across the capacitor 33 is the peak point voltage of the transistor 31, that transistor is switched into a low resistance or "on" state. The capacitor 33 will then discharge through the emitter-base circuit of the transistor 31 into the gate of the SCR 21 turning it on. When the SCR 21 is turned on, the lamp 22 will be illuminated and the capacitor 47 will be charged through the resistor 45. When the voltage across the capacitor 47 reaches the switching voltage of the Schockley diode 44, the Schockley diode 44 is switched to an "on" condition discharging the capacitor 47 and forcing the voltage at the circuit point 34 more negative than the conductor 26 which switches SCR 21 back to its nonconductive state. The cycle is then repeated and the blinking of the light 22 provides a signal when the voltage of the battery 16 is below the value set by the position of the adjustable tap on the resistor 37.

When the voltage of the battery 16 is high and the lamp 22 is not blinking, the capacitor 58 charges via the lamp 22 and the resistors 25, 56 and 55. The diode 57 is in the blocking direction and does not effect the charging of the capacitor 58. When the voltage on the capacitor 58 reaches the Zener voltage of the Zener diode 53, current can flow into the base of the transistor 50 turning it on. The resistor 52 in the collector circuit of the transistor 50 allows the collector to reach the saturation level. When the transistor 50 is saturated, the timing capacitor 48 is grounded via the diode 51 and the transistor 50 and the capacitor 48 cannot charge and no timing cycle will be initiated.

When the lamp 22 starts blinking, however, the capacitor 58 discharges via resistor 55, the diode 57 and the SCR 21. This removes the base current from the transistor 50 and turns it off removing the ground on the capacitor 48 and allowing it to charge starting the timing cycle. The charging time of the capacitor 58 via resistors 55 and 56 is longer than the blinking time of the lamp 22. While the discharge time via resistor 55 and diode 57 is much shorter than the "lamp on" time, during the "lamp off" time, the capacitor 58 cannot charge to a high enough value to saturate the transistor 50 and this partial charge is discharged during the next time the lamp 22 is on. As long as the lamp 22 is blinking, the charging of the capacitor 48 continues. When the lamp 22 stops blinking for longer than the charging time of the capacitor 58, the transistor 50 will saturate and timing will stop.

The charging time of the capacitor 48 is determined by the capacitor 48, resistor 59 and adjustable voltage source formed by the resistors 61 and 62. When the resistor 61 is adjusted for maximum resistance, the resistor 59 receives minimum source voltage resulting in a longer time period. When the resistor 61 is adjusted for minimum resistance, the resistor 59 receives maximum source voltage and the timing period is decreased. If the blinking of the lamp 22 is sustained for a sufficient period of time, the unijunction transistor 49 will cause the charge on the capacitor 48 to discharge through the emitter base circuit of the transistor 49 into the gate of the SCR 70 causing it to fire.

In general, when the SCR 70 is in the "off" state, the SCR 68 is in the "on" state energizing the contact coil 69 through manually operated control switch 78 and hence the hydraulic pump motor 17 is energized by the battery 16, through the normally open contact associated with contactor coil 69 that is shown in the drawing as being closed and connected in series with the pump motor 17. The SCR 68 is turned "on" by current flowing into its gate through the Schockley diode 75 once the capacitor 76 is charged to the firing voltage of the Schockley diode 75. When the SCR 68 is in the "on" state, the capacitor 77 charges via the resistor 73 in preparation for turning off the SCR 68. When the SCR 70 is fired at the end of the timing cycle, the capacitor 77 is connected across the SCR 68 and the charge on it turns the SCR 68 off deenergizing the contact coil 69 and disconnecting the hydraulic pump motor 17. The gate of the SCR 68 is simultaneously clamped near ground potential preventing the reenergization of the SCR 68. To remove this lockout, the battery supply has to be disconnected as would occur when the battery is connected to a charger.

More specifically, the operation of switching circuit is as follows: with the manually operated control switch 78 open, then through resistor 73, diode 72 and resistor 74, capacitor 76 charges to the breakover voltage of Shockley diode 75 in approximately 10 milliseconds, such time being arbitrary and being set by the parameters of the various circuit elements. When this voltage is reached, Shockley diode 75 breaks over and allows capacitor 76 to discharge into the gate of SCR 68. This action follows the relaxation oscillator principle and repeats approximately every 10 milliseconds. The turn on of SCR 68 allows capacitor 77 to charge with a positive voltage resulting at the interconnection of resistor 73 and diode 72.

When manually operated control switch 78 is closed by an operator, SCR 68 will turn on in a maximum time of 10 milliseconds from the relaxation oscillator, namely, resistors 73, 74 capacitor 76 and Shockley diode 75. This permits current from the battery to flow in the anode-cathode circuit of SCR 68 which energizes contactor coil 69 which in turn closes the contact associated therewith This energizes the hydraulic pump direct current motor 17.

If a low voltage condition persists for the predetermined length of time, i.e., the timing cycle, a firing pulse is applied to SCR 70. SCR 70 will then turn on, causing two resulting actions:

1. The positive end of capacitor 77 is now brought to within the diode 72 and SCR 70 forward voltage drop to negative terminal 15. This causes the negative end of capacitor 77 to force the anode of SCR 68 to turn negative thereby rendering this SCR nonconductive, interrupting the coil current of contactor 69 and opening the contact associated therewith which deenergizes pump motor 17; and, 2. Resistor 74, being connected to the interconnection of SCR 70 and diode 72, is as a result of SCR 70 turning on, no longer able to sustain the relaxation oscillator operation and SCR 68 cannot refire, even if switch 78 is recycled. This lockout as stated above, would be removed when the battery is connected to a charger.

By way of illustration, the following components are typical of those which could be employed in the embodiment of the present invention shown in FIG. 2.

Resistor:
| | | |
|---|---|---|
| 39 | ohms | 1,200 |
| 27 | ohms | 30,000 |
| 36 | ohms | 47 |
| 25 | ohms | 30 |
| 45 | ohms | 220,000 |
| 42 | ohms | 4.7 |
| 38 | ohms | 100 |
| 37 | ohms | 1,000 |
| 56 | ohms | 68,000 |
| 55 | ohms | 1,000 |
| 54 | ohms | 27,000 |
| 30 | ohms | 1,200 |
| 52 | ohms | 10,000 |
| 65 | ohms | 2,700 |
| 61 | ohms | 10,000 |
| 62 | ohms | 24,000 |
| 59 | ohms | 44,000,000 |
| 64 | ohms | 150 |
| 63 | ohms | 47 |
| 71 | ohms | 3,000 |
| 73 | ohms | 12,000 |
| 74 | ohms | 75,000 |

Capacitor:
| | | |
|---|---|---|
| 43 | mfd | 20 |
| 33 | mfd | 10 |
| 47 | mfd | 1 |
| 58 | mfd | 50 |
| 66 | mfd | .047 |
| 48 | mfd | 2 |
| 77 | mfd | 4 |
| 76 | mfd | .22 |

Zener diode:
| | |
|---|---|
| 35 | 1N758 |
| 53 | 1N753 |
| 40 | 1N758 |

Diode:
| | |
|---|---|
| 46 | 1N3253 |
| 24 | 1N3253 |
| 57 | 1N3253 |
| 51 | FD333 |
| 72 | 1N3253 |

Transistor:
| | |
|---|---|
| 31 | 2N2646 |
| 50 | TN61 |
| 49 | 2N4851 |

Schockley diode:
| | |
|---|---|
| 44 | M4L3054 |
| 75 | M4L3054 |

Silicon controlled rectifier:
| | |
|---|---|
| 68 | C20F |
| 70 | C6F |
| 21 | C6F |

This particular set of components is designed to indicate the state of charge of a 12 cell nominal 24 volt lead acid industrial truck battery. The ranges on the adjustable resistors are such as to provide a 2 minute time delay between the indication of low battery voltage and the disconnecting of the hydraulic pump motor controls from the battery. The differential between the on and off states of the indicator portion of the device is less than 0.1 volt. It also should be noted that the circuitry is designed so that it will not be damaged by a reverse polarity connection. In addition, it has excellent resistance to shock and vibration.

From the foregoing, it can be shown that by means of the present invention it is possible to have an indication as to when a battery voltage falls below a given level signalling the need for recharging. The device is also operative if the indication is ignored for a predetermined period of time to prevent the truck from performing any material-handling operation until the battery is recharged. Since the truck will be unable to perform material-handling functions, the power remaining in the battery will be utilized entirely in returning the truck to the charging station.

We claim:

1. A battery discharge indicator comprising a pair of terminals adapted to be connected across the terminals of a battery under supervision, indicating means connected in series with a solid state switching element across said terminals, circuit means including voltage-regulating means connected to said switching element and responsive to the difference between the voltage across said terminals and the voltage across said voltage-regulating means to activate said switching element to energize said indicating means when the voltage across said terminals decreases to a predetermined value relative to the voltage across said voltage-regulating means, timing means connected to said switching element to initiate a timing cycle upon the energization of said indicating means, switching means connected to said timing means to perform a control function at the end of said timing cycle, said switching means including a controlled rectifier having an anode, a cathode and a control element means operatively connected to the anode of said controlled rectifier for rendering said controlled rectifier nonconductive at the end of said timing cycle, and second circuit means connected to said solid state switching element to deenergize it to cause said indicating means to be alternately energized and deenergized as the voltage of said battery decreases to said predetermined value.

2. A battery discharge indicator and control means for an industrial material handling truck comprising, in combination, a pair of terminals adapted to be connected across the battery supplying power to said truck, indicating means connected in series with a solid-state switching element across said terminals, circuit means including voltage regulating means connected to said switching element and responsive to the difference between the voltage across said terminals and the voltage across said voltage-regulating means to activate said switching element to energize said indicating means when the voltage across said terminals decreases to a predetermined value relative to said voltage-regulating means, second circuit means connected to said switching element to periodically deactivate said switching element and deenergize said indicating means to cause said indicating means to be periodically energized when the voltage across said terminals decreases to said predetermined value, timing means connected to said switching element and periodically energized when the voltage across said terminals decreases to said predetermined value, the periodic energization of said timing means providing a timing cycle and switching means including a controlled rectifier operatively connected to said timing means, said controlled rectifier being arranged so as to be deenergized by said timing means at the end of said timing cycle, the deenergization of said controlled rectifier preventing said truck from performing any material handling operation until said terminals are disconnected from said battery.

3. Apparatus as specified in claim 2 wherein said timing means comprises a capacitor fired unijunction transistor which is charged in pulses to the firing voltage of the transistor.

4. Apparatus as defined in claim 2 wherein said industrial material-handling truck includes a hydraulic pump direct current motor, a relay having a normally open contact and an operating coil, said motor and said contact being connected in series across said battery, said controlled rectifier having an anode-cathode circuit and a control element, said anode-cathode circuit being connected in series with said operating coil across said battery, said anode-cathode circuit of said controlled rectifier normally open contact is held closed thereby supplying operating current to said motor, and means operatively connected to the anode of said controlled rectifier for rendering said controlled rectifier nonconductive at the end of said timing cycle whereby current will terminate in said anode-cathode circuit effecting opening of said contact and thus, disconnecting said motor from said battery.